Aug. 16, 1966 G. A. VAN DINE 3,267,297
DELAY LINE TIMED PULSE GENERATOR
Filed July 22, 1964 2 Sheets-Sheet 1
FIG. 1
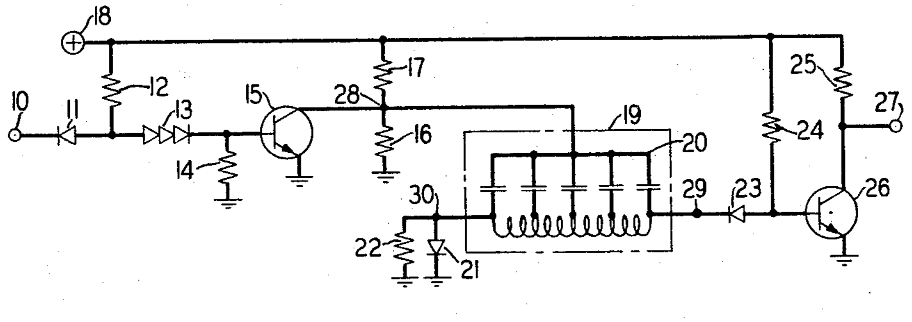
FIG. 2
FIG2a. FIG2b. FIG2c. FIG2d. FIG2e.
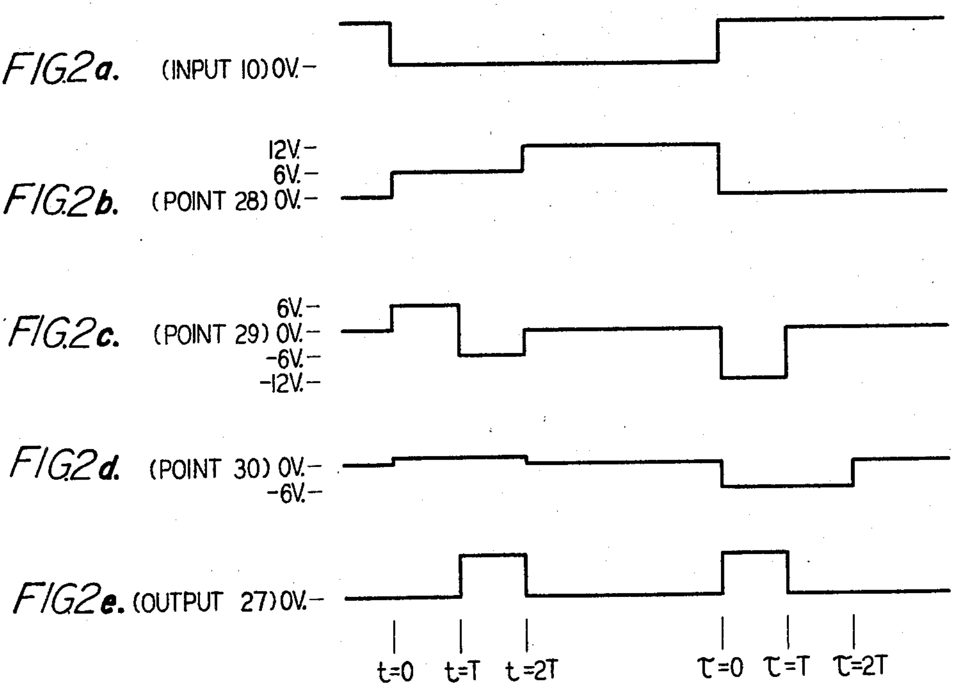
INVENTOR
G. A. VAN DINE
BY John K. Mullarney
ATTORNEY 3,267,297
DELAY LINE TIMED PULSE GENERATOR Gilbert A. Van Dine, Middletown, N.J., assignor to Bell Telephone Laboratories, Incorporated, New York, N.Y., a corporation of New York Filed July 22, 1964, Ser. No. 384,497
18 Claims. (Cl. 307—88.5)

The present invention relates to pulse generating circuits, and more particularly to triggered transistor pulse generating circuits which utilize a delay line as the timing element.

Pulse generating circuits in the prior art have commonly used R-C networks to determine the output pulse width. Still other circuits in the prior art have used delay lines in order to perform this function. Both delay lines and R-C timing networks have also been extensively used in prior art circuits to produce an output signal which is delayed from that of the input signal by a predetermined interval of time. For both purposes, that is for accurately determining the width of an output pulse and for delaying the output relative to the input, the delay line has an inherent advantage of timing accuracy. In order to produce an output pulse of accurately predetermined width which is also delayed from the input by an interval of time, two circuits have heretofore been employed. Typically, a one-shot multivibrator is utilized to produce an undelayed pulse having a width equal to the desired delay interval, and the trailing edge of the undelayed pulse is then used to trigger a second one-shot multivibrator, which in turn produces the output pulse of predetermined width. Even where it is desired to have a delay interval equal to that of the output width, two independent circuits have had to be used.

It is accordingly, a primary object of the present invention to provide a circuit using a single delay line which produces an output pulse of accurately determined time duration where the beginning of the output is delayed from the triggering signal by the same accurately determined amount of time.

Another object of the invention is to provide a circuit using a single delay line which produces in response to a single input pulse a pair of output pulses of accurately determined time duration with a predetermined time separation therebetween.

Still another object is to provide pulse generating circuits which produce a delayed output pulse in response to an input step of one polarity and, in addition, produce an output pulse of the same width without substantial delay in response to an input step of the opposite polarity.

These and other objects are obtained in accordance with the present invention wherein a delayed pulse generator uses a single delay line for the dual purpose of delaying the output pulse and determining its width. One end of the delay line is connected through a first diode to ground, and the other end is connected through a second oppositely poled diode to the control element of a normally ON transistor. A voltage pulse source having a finite impedance supplies a pulse, having a width of at least twice the one propagation time (T) of the line to the common terminal of the delay line with a polarity such that the initial step of the voltage pulse causes the first diode to conduct and the second diode to be back-biased. Conduction by the first diode results in a wave front of voltage which proceeds along the line from the first to the second diode. Upon reaching the second diode, this wave front causes it to conduct and the transistor to be cut off. Because of the high impedance of the transistor input network, the wave front encounters a substantially open circuit compared to the characteristic impedance of the delay line and therefore reflects. The reflected wave front proceeds back to the first diode and terminates in an impedance which is substantially equal to the characteristic impedance of the line. Current ceases to flow into the line upon termination of the wave front; accordingly, the voltage drop, which up to this time has existed across the source impedance, also ceases, thereby permitting the common terminal to "jump up" to the full value of the initial voltage pulse. The other end of the delay line being coupled to the common terminal by way of the characteristic line impedance "jumps back" to its original potential thereby turning the transistor back ON. In summary, the normally ON transistor is not turned off until time T after the application of the input voltage pulse, and only remains off for a period of time equal to T.

A feature of the invention is that a pair of output pulses of accurately determined time durating are produced in response to a single input pulse.

A further feature of the invention relates to a manner of inhibiting the output pulse which normally occurs at the time when the input trigger pulse is terminated. As a result, only a delayed output pulse of predetermined width appears at the output.

Another feature of the present invention relates to means for inhibiting the output pulse which appears a predetermined interval of time after the initiation of the input pulse. As a result, a pulse will appear at the output only after the termination of the input pulse.

A still further feature of the invention relates to means for clamping the input after the delayed output pulse has appeared in order to permit operation of the circuit by an input pulse having a duration which is less than twice the one way propagation time of the delay line.

Other objects and features of the invention will be more readily understood from the following detailed description taken in conjunction with the accompanying drawings in which:

FIG. 1 is a schematic circuit diagram of a pulse generating circuit constructed in accordance with the principles of the present invention;

FIG. 2 illustrates certain wave forms useful in the explanation of the present invention;

Figure 3:
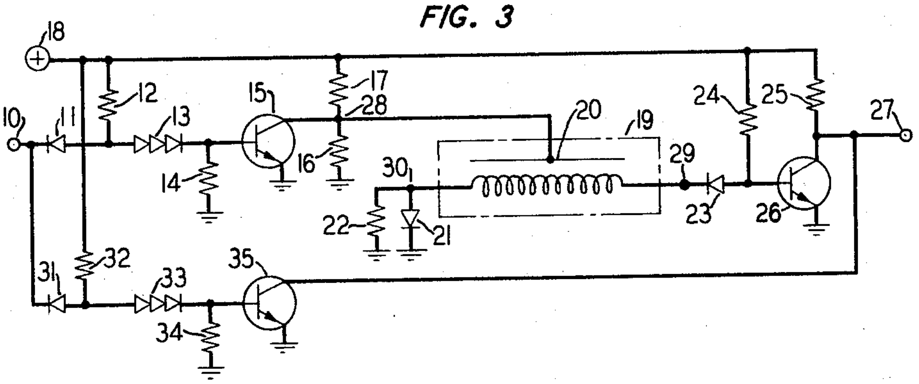
FIG. 3 is a schematic circuit diagram of a preferred embodiment for producing an accurately timed output pulse of selected duration in response to an input pulse, but delayed from the start of the input pulse by a time interval equal to that of the output pulse width.

Referring now to FIG. 1 of the drawings there is shown two NPN junction type transistors 15 and 26, each connected in a grounded emitter configuration. With no signal applied to input 10, transistors 15 and 26 will remain in a stable state, normally ON, condition. Transistor 26 is normally held in conduction by a current which flows from potential source 18, through resistor 24, through its base emitter junction to ground. Although diodes 21 and 23 form a path through delay line 19 which is in parallel with the base emitter junction of transistor 26, the forward breakdown potential of the diodes in series is greater than the forward breakdown potential of the base emitter junction of transistor 26 and therefore only a negligible amount of current from resistor 24 flows through diodes 21 and 23. Transistor 15 is normally held in conduction by a current which flows from potential source 18, through resistor 12, through multilayered diode 13, through its base emitter junction to ground. If the circuit were to be operated by connecting input 10 directly to ground a single diode would suffice in place of the multilayered diode 13. Typically, however, input 10 will be connected to ground through a small but finite potential drop such as the collector to emitter junction potential of a transistor in conduction. In order to insure that transistor 15 will be turned off when input 10 is connected to this finite potential, multilayered diode 13 is connected between resistor 12 and the base of transistor 15, thereby causing the path provided by diode 13 and the base emitter junction of transistor 15 to have a greater forward-biased breakdown potential than the path provided through diode 11 and the finite potential connected to input 10. In place of multilayered diode 13 two or more diodes could of course be utilized in series.

With transistor 15 in conduction, its collector is substantially at ground potential. Hence, delay line 19, with its common terminal 20 connected to the collector of transistor 15 and its other side connected through diode 21 to ground, is normally uncharged. While the symbolic representation of a lumped parameter type delay line is illustrated in the figure it will be clear to those in the art that a distributed parameter delay line can also be advantageously used herein, and the invention is no way limited to the type of delay line utilized.

In order to understand the operation of the circuit of FIG. 1, it will be helpful to refer to the wave forms of FIG. 2. FIG. 2 contains the voltage wave forms versus time of the voltages with respect to ground at five selected points in the circuit of FIG. 1. The time scale of FIG. 2 has been marked off in units of T, the one way propagation time of delay line 19, and the scale has been separated into two parts: first, the time at which the input pulse is applied has been designated as $t=0$; and second, the time at which the input pulse is terminated has been designated as $\tau=0$. In order to facilitate an understanding of the existing relationships between the various wave forms of FIG. 2, voltage values are indicated and will be referred to in the discussion. It is to be understood, however, that the particular values chosen are for illustrative purposes only, and their absolute magnitudes are in no way critical.

Before the application of the input pulse (i.e. before $t=0$), the voltage at input 10, shown in FIG. 2(*a*), is at a positive potential. Transistor 15 is therefore in conduction and the potential at point 28, shown in FIG. 2(*b*), is substantially at zero volts, as are the potentials at point 29, shown in FIG. 2(*c*), and at point 30, shown in FIG. 2(*d*). For reasons stated hereinbefore, transistor 26 is also in conduction and the potential at output 27, shown in FIG. 2(*e*), is substantially at zero volts. At $t=0$, an input pulse is applied by clamping input 10 to substantially ground potential, as shown in FIG. 2(*a*). Diode 11 then provides the current through resistor 12 with a much lower resistive path than is available through diode 13 and the base emitter junction of transistor 15; transistor 15 is consequently turned off. Since the high storage capacitance of diode 13 will not allow the voltage across it to change instantaneously, clamping input 10 to substantially zero potential will cause the transistor base to momentarily go negative. This negative excursion in potential helps to remove the storage charge from the junction of transistor 15 and accordingly causes the latter to turn off rapidly.

When transistor 15 goes out of conduction, the potential at point 28 will endeavor to rise toward a positive potential determined by resistors 16 and 17. For reasons given hereinafter resistors 16 and 17 are advantageously chosen such that their parallel combination equals the characteristic impedance of delay line 19. Hence, for a potential source 18 of 24 volts and resistors 16 and 17 of equal value, as in this example, the potential at point 28 will endeavor to rise toward a potential of 12 volts. The junction of resistors 16 and 17 is also connected to common terminal 20 of delay line 19. The capacitive effect exhibited by the delay line will not allow the charge on the delay line to be changed instantaneously. Hence, a rise in potential on common 20 will cause both ends of delay line 19 to also endeavor to rise in potential. The end of delay line 19 which is connected to point 30 will not be permitted to rise in potential since diode 21 will be forward-biased, thereby clamping point 30 to ground and allowing a current to flow into the delay line, which initiates the propagation of a transient along the line. Since the parallel combination of resistors 16 and 17 has been made substantially equal to the characteristic impedance of delay line 19, the initial voltage which appears at point 28 is equal to one-half of the eventual potential at this point because of the current flow into point 30. Accordingly, at $t=0$ the potential at point 28 rises, as shown in FIG. 2(*b*), to one-half of the eventual 12-volt potential.

The rise in positive potential at point 29 causes diode 23 to be back-biased; hence, point 29 is permitted to follow common 20 in the 6-volt potential rise at $t=0$, as shown in FIG. 2(*c*). The back-bias of diode 23 will, of course, have no effect on the state of transistor 26. Accordingly transistor 26 will remain in conduction, and the potential on its collector will remain at substantially zero volts as shown in FIG. 2(*e*).

At $t=T$, the 6-volt transient wave front from the point 30 end of the line reaches point 29. Since resistor 24 is high in value compared to the characteristic impedance of the line, the wave front reflects from point 29 as though reflecting from an open circuit thereby causing an equal amplitude in-phase wave to proceed back toward point 30. The sum of the incident and reflected wave fronts causes the potential at point 29 to drop 12 volts at $t=T$, thereby causing the cathode of diode 23 to change from a positive 6 volts to minus 6 volts as shown in FIG. 2(*c*). With minus 6 volts on the cathode of diode 23, the current through resistor 24 no longer prefers the base emitter junction of transistor 26 but instead flows into forward-biased diode 23 and causes transistor 26 to be turned off. Accordingly, the potential at output 27, when no longer clamped at substantially zero potential by the collector-emitter path of transistor 26, will rise in positive potential at $t=T$ as shown in FIG. 2(*e*).

At $t=2T$, the reflected voltage wave front arrives at point 30 and terminates in the source impedance composed of resistors 16 and 17 in parallel which is advantageously made equal to the characteristic impedance of delay line 19. Since delay line 19 is now fully charged, and since the voltage wave front is terminated in the line's characteristic impedance, current ceases to flow into the delay line, and the potential at point 28 rises to its full value of 12 volts as shown in FIG. 2(*b*). This sudden rise of 6 volts on common 20 of the delay line is capacitively coupled to point 29 thereby causing the cathode of diode 23 to return to its former potential near zero whereby the current through resistor 24 again prefers to flow through the base emitter junction of transistor 26. Accordingly, transistor 26 is returned to conduction and the potential on its collector is again reduced to substantially zero potential as shown in FIG. 2(*e*). In summary, an output voltage pulse equal in width (i.e., duration) to the one-way propagation time of the line (T) is produced at output 27 an interval of time, T, after the initiation of a negative step at input 10.

At $\tau=0$ the input pulse is terminated, as shown in FIG. 2(*a*); the current through resistor 12 again flows through multilayered diode 13 and the base-emitter junction of transistor 15 causing transistor 15 to be returned to conduction with its collector clamped to substantially ground potential as shown in FIG. 2(*b*). The resulting negative 12-volt step at point 28 is then capacitively coupled to the other side of the delay line. The negative voltage which appears at point 30 causes diode 21 to be back-biased, but a current is still permitted to flow through resistor 22 to establish a transient voltage wave front at this end of the line. For reasons to be given hereinafter resistance 22 is advantageously made substantially equal in value to the characteristic impedance of delay line 19; accordingly only 6 volts of the 12-volt drop will appear across delay line 19 and the other 6 volts will appear across resistor 22 from point 30 to ground as shown in FIG. 2(*d*). The point 29 end of the delay line drops the entire 12-volt potential as shown in FIG. 2(*c*). Although this drop causes diode 23 to be forward-biased, resistance 24 is a much higher value than the characteristic impedance of delay line 19 and the current which flows through diode 23 produces only an insignificant voltage wave front at this end of the line. Forward-biasing of diode 23, however, does cause the current through resistor 24 to no longer prefer the base-emitter junction of transistor 26. Accordingly, transistor 26 is caused to turn off and its collector is permitted to rise in potential as shown in FIG. 2(*e*).

After a time interval of T subsequent to the positive-going step on input 10, the aforementioned voltage wave front will have travelled the entire length of the line; it then reflects from the substantially open circuit provided by high valued resistor 24 and cut-off transistor 26. The sum of the incident and reflected in-phase voltage wave fronts causes the potential at point 29 to return to its stable state potential as shown in FIG. 2(*c*) at $\tau=T$. Accordingly, the current through resistor 24 will again prefer to flow through the base-emitter junction of transistor 26, causing the latter to be turned ON, thereby clamping output 27 to substantially ground potential as shown in FIG. 2(*e*).

At $\tau=2T$ the reflected voltage wave front will arrive at the point 30 end of the line terminate in resistor 22 which is advantageously made equal to the characteristic impedance of delay line 19. In summary, termination of the input pulse produces an output pulse of T duration, with the leading edge of the same coincident with said termination. The delay line completes recovery after an additional interval of T.

For some applications the output pulse which occurs at the termination of the input pulse may be unwanted. In the schematic diagram of FIG. 3 a circuit is shown which prevents the second pulse from appearing at the output. It is readily seen that the circuit in FIG. 3 is similar to the circuit in FIG. 1 except that a stage of transistor logic has been added between input 10 and output 27. The stage is composed of component elements 31 through 34 and transistor 35 which operate in response to the signal at input 10 in exactly the same way as elements 11 through 14 and transistor 15, respectively. That is to say, a positive voltage step at input 10 will return transistor 35 to its stable state of conduction, whereas clamping input 10 to substantially ground potential will cause transistor 35 to be taken out of conduction. Accordingly, after $t=0$ when input 10 is clamped to substantially ground potential, transistor 35 is OFF and will have no effect on the production of the delayed output pulse from $t=0$ to $t=T$. On the other hand, when the input trigger pulse is terminated at $\tau=0$, transistor 35 is turned ON and its collector clamps output 27 to substantially zero potential even though transistor 26 is forced to turn OFF for an interval of T. Consequently, no output pulse appears at output 27 in response to the termination of the input pulse.

Figure 4:
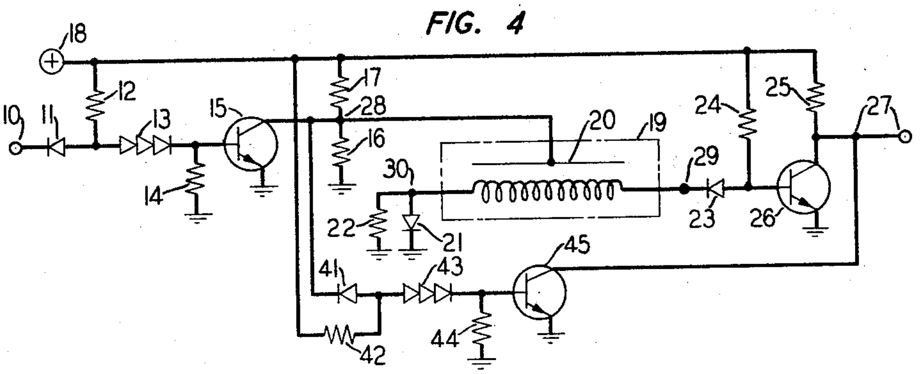
FIG. 4 is a schematic circuit diagram of an embodiment for producing an output pulse only after the input pulse has been terminated.

For other applications it may be desirable to eliminate the output pulse which appears at an interval of T after the initiation of the input pulse, and to produce or allow only the output pulse which appears at the termination of the input pulse. In the schematic diagram of FIG. 4 a circuit is shown which prevents the pulse at $t=T$ from appearing at output 27. It is readily seen that the circuit in FIG. 4 is similar to the circuit in FIG. 3 except that the cathode of diode 41 is connected to point 28 whereas the cathode of diode 31 is connected to input 10. Otherwise, elements 41 through 45 are identical to elements 31 through 35 respectively, and output 27 is affected in the same way in response to potentials on terminal 28 as it was to potentials on input 10 in the FIG. 3 circuit. When transistor 15 is OFF, the positive potential at point 28 back-biases diode 41, and transistor 45 is placed in conduction clamping output 27 to substantially ground potential. When transistor 15 is ON, diode 41 is forward-biased, transistor 45 is OFF, and the potential at output 27 is determined by the state of transistor 26.

Referring to FIG. 2(*b*), it can be readily seen that point 28 is at a positive potential only during the period of time when the input pulse is present. Hence, transistor 45 is in conduction and therefore clamping the output when transistor 26 is turned off at $t=T$, but it is not in conduction when transistor 26 is turned off at $\tau=0$. Consequently, only the output pulse which appears at $t=T$ will be eliminated from output 27 by the action of transistor 45.

As will be obvious to those skilled in the art, the circuits shown in FIGS. 3 and 4 may be simultaneously provided by having additional input diodes such that either of the circuits may be selected electronically or by electro-mechanical switching means.

Figure 5:
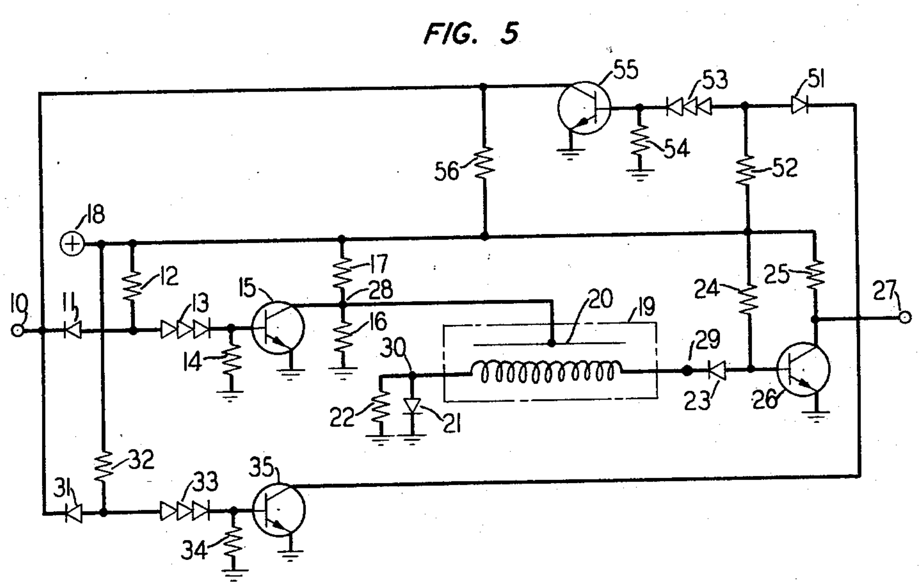
FIG. 5 is a schematic circuit diagram of a preferred embodiment for producing an accurately determined delayed output pulse in response to an input pulse having a duration less than twice the one way propagation time of the line.

Still other applications of the invention may require the production of a delayed output pulse in response to a circuit which supplies a ground at input 10 which is shorter in duration than 2T. In the schematic diagram of FIG. 5 a circuit is shown which will provide a single output pulse, T in width, which is delayed from the initiation of the input pulse by an interval of T; the input pulse here need only be at least one T in duration. It is readily seen that the circuit of FIG. 5 is similar to the circuit of FIG. 3 except that an additional stage of transistor logic is added between output 27 and input 10. The circuit components 51 through 55 operate in the same manner as the components 11 through 15 respectively, in that a positive potential on the cathode of diode 51, back-biases the diode and permits transistor 55 to remain in conduction, whereas clamping the cathode of diode 51 to substantially ground potential causes transistor 55 to be turned off. When transistor 55 is OFF its collector exerts no influence on input 10, and the remainder of the FIG. 5 circuit operates in the same way as the circuit of FIG. 3. During the output pulse interval, however, diode 51 is back-biased, and transistor 55 is therefore in conduction causing input 10 to be clamped to ground potential. Since input 10 is clamped through transistor 55 whenever the output pulse is present, the input ground which is supplied by the activating circuit at $t=0$ is not needed after $t=T$ and may therefore be terminated any time before $t=2T$.

While the transistors employed have been shown and described as NPN junction transistors, it is obvious that PNP junction transistors are equally suitable so long as the polarities of the direct-current potential source and the direction of easy current flow of the diodes are reversed. It is to be understood therefore that the above-described arrangements are merely illustrative of the application of the principles of the present invention. Numerous other arrangements may be devised by those skilled in the art without departing from the spirit and scope of the invention.

What is claimed is:

1. A delayed pulse generator comprising a transistor having an input electrode, an output electrode and a common electrode, means for connecting said common electrode to a reference potential, means for normally biasing said transistor into conduction, a delay line, input means for delivering pulses of a duration of at least twice the one-way propagation time of said delay line, said delay line having its common terminal connected to said input means, first diode means having one terminal connected to one end of said delay line with the other terminal thereof connected to reference potential, and second diode means having one terminal connected to the other end of said delay line and the other terminal thereof connected to said input electrode with the diode means and the input-common electrode path of said transistor connected in series opposition, the poling of the first diode means with respect to said delay line being opposite that of the second diode means.

2. A delayed pulse generator as described in claim 1 wherein said first diode means comprises a resistor and diode in parallel.

3. In combination, a transistor having an input electrode, an output electrode and a common electrode, means for connecting said common electrode to a point of reference potential, means for normally biasing said transistor into conduction, a delay line, means for applying pulses of predetermined polarity and duration to the common terminal of said delay line, a first diode having one terminal connected to one end of said delay line and the other terminal thereof connected to a point of reference potential, a second diode having one terminal connected to the other end of said delay line and the other terminal thereof connected to the input electrode of said transistor with the diode and the input-common electrode path of said transistor connected in series opposition, the poling of said first diode with respect to said delay line being opposite that of the second diode.

4. The combination as defined in claim 3 wherein the said one end of the delay line is terminated in its characteristic impedance.

5. A delayed pulse generator comprising a transistor having an input electrode, an output electrode, and a common electrode, means for connecting said common electrode to a reference potential, means for biasing said transistor into conduction, a delay line, input means for delivering pulses of a duration of at least twice the one-way propagation time of said delay line, said delay line having its common terminal connected to said input means, first diode means having one terminal connected to one end of said delay line with the other terminal thereof connetced to a reference potential, second diode means having one terminal connected to the other end of said delay line and the other terminal thereof connected to said input electrode, with the diode means and the input-common electrode path of said transistor connected in series opposition, the poling of said first diode means with respect to said delay line being opposite that of the second diode means, and means interconnecting the input means and the output electrode for clamping the latter during time intervals when the input pulse is not present.

6. A pulse generator comprising a transistor having an input electrode, an output electrode, and a common electrode, means for connecting said common electrode to a reference potential, means for biasing said transistor into conduction, a delay line, input means for delivering pulses of a duration of at least twice the one-way propagation time of said delay line, said delay line having its common terminal connected to said input means, first diode means having one terminal connected to one end of said delay line with the other terminal thereof connected to a reference potential, second diode means having one terminal connected to the other end of said delay line and the other terminal thereof connected to said input electrode with the diode means and the input-common electrode path of said transistor connected in series opposition, the poling of said diode means with respect to said delay line being opposite that of the second diode means, and means interconnecting the input means and the output electrode for clamping the latter during the time interval when the input pulse is present.

7. In combination, a pair of transistors each connected in common emitter configuration, means for biasing each of said transistors into conduction, a delay line having its common terminal connected to the collector of one of said pair of transistors, input means for delivering pulses of a duration of at least twice the one-way propagation time of the delay line, means for connecting the base of said one transistor to said input means, first diode means having one terminal connected to one end of said delay line with the other terminal thereof connected to a point of reference potential, and second diode means having one terminal connected to the other end of said delay line and the other terminal thereof connected to the base of the other of said pair of transistors with the diode means and the base-emitter path connected in series opposition, the poling of said first diode means with respect to said delay line being opposite that of said second diode means.

8. The combination as described in claim 7 wherein said first diode means comprises a diode and resistor in parallel.

9. The combination as described in claim 7 including coupling means interconnecting the input means and the collector of the other transistor for voltage clamping the latter collector except when the input pulse is present.

10. The combination as described in claim 7 including coupling means interconnecting the collector of said one transistor and the collector of said other transistor for voltage clamping the latter collector when the input pulse is present.

11. A delayed pulse generator comprising first, second, and third transistors each connected in common emitter configuration, means for biasing each of said transistors into conduction, a delay line having its common terminal connected to the collector of the first transistor, input means for delivering pulses of a duration of at least twice the one-way propagation time of the delay line, first connecting means for delivering the input pulses to the base of the first transistor, second connecting means for delivering the input pulses to the base of the third transistor, first diode means having one terminal connected to one end of said delay line with the other terminal thereof connected to a point of reference potential, second diode means having one terminal connected to the other end of said delay line and the other terminal thereof connected to the base of the second transistor with the diode means and the base-emitter path connected in series opposition, the poling of said first diode means with respect to the delay line being opposite that of said second diode means, and means interconnecting the collector of said second transistor and the collector of said third transistor.

12. A delayed pulse generator as described in claim 11 wherein said first diode means comprises a diode in parallel with a resistor having a value substantially equal to the characteristic impedance of the delay line.

13. A delayed pulse generator comprising first, second, and third transistors each connected in a common emitter configuration, means for biasing each of said transistors into conduction, a delay line having its common terminal connected to the collector of the first transistor, input means for delivering pulses of a duration of at least twice the one-way propagation time of the delay line, said first transistor having its base connected to said input means, means for coupling the collector of said first transistor and the base of said third transistor, first diode means having one terminal connected to one end of said delay line with the other terminal thereof connected to a point of reference potential, second diode means having one terminal connected to the other end of said delay line and the other terminal thereof connected to the base of the second transistor with the diode means and the base-emitter path connected in series opposition, the poling of said first diode means with respect to the delay line being opposite that of said second diode means, and means interconnecting the collector of said third transistor and the collector of said second transistor.

14. A delayed pulse generator as described in claim 13 wherein said first diode means comprises a diode in parallel with a resistor having a value substantially equal to the characteristic impedance of the delay line.

15. In combination, a pair of transistors each connected in common emitter configuration, means for biasing each of said transistors into conduction, an input junction, input means connected to said input junction for delivering pulses of a duration of at least the one-way propagation time of the delay line, means for coupling the base of one of said pair of transistors to the input junction, a delay line having its common terminal connected to the collector of said one transistor, first diode means having one terminal connected to one end of said delay line with the other terminal thereof connected to a point of reference potential, second diode means having one terminal connected to the other end of said delay line and the other terminal thereof connected to the base of the other of said pair of transistors with the diode means and the base-emitter path connected in series opposition, the poling of said first diode means with respect to said delay line being opposite that of said second diode means, an output junction, means for connecting the collector of the other transistor to said output junction, first coupling means interconnecting the input junction and the output junction for clamping the output in response to a quiescent state at the input, and second coupling means interconnecting the output junction and the input junction for clamping the input to a pulsed state in response to a pulse at the output.

16. The combination as described in claim 15 wherein said first diode means comprises a diode in parallel with a resistor having a value substantially equal to the characteristic impedance of the delay line.

17. A delayed pulse generator comprising first, second, third, and fourth transistors each connected in common emitter configuration, means for biasing each of said transistors into conduction, an input junction, input means connected to said input junction for delivering pulses of a duration of at least the one-way propagation time of the delay line, first coupling means for connecting the base of said first transistor to the input junction, a delay line having its common terminal connected to the collector of said first transistor, first diode means having one terminal connected to one end of the delay line with the other terminal thereof connected to a point of reference potential, second diode means having one terminal connected to the other end of the delay line and the other terminal thereof connected to the base of said second transistor with the diode means and the base-emitter path connected in series opposition, the poling of said first diode means with respect to the delay line being opposite that of said second diode means, an output junction, second coupling means for connecting the collector of said second transistor to said output junction, first means interconnecting the collector of said third transistor and the output junction, second means interconnecting the collector of said fourth transistor and the input junction, third diode means coupling the input junction to the base of said third transistor for taking the latter transistor out of conduction in response to a quiescent state at the input junction, and fourth diode means coupling the output junction to the base of said fourth transistor for normally maintaining the latter transistor out of conduction except when a pulse appears at the output junction.

18. A delayed pulse generator as described in claim 17 wherein the first diode means comprises a diode in parallel with a resistor having a value substantially equal to the characteristic impedance of the delay line.

No references cited.

ARTHUR GAUSS, *Primary Examiner.*

I. C. EDELL, *Assistant Examiner.*